Patented Apr. 22, 1930

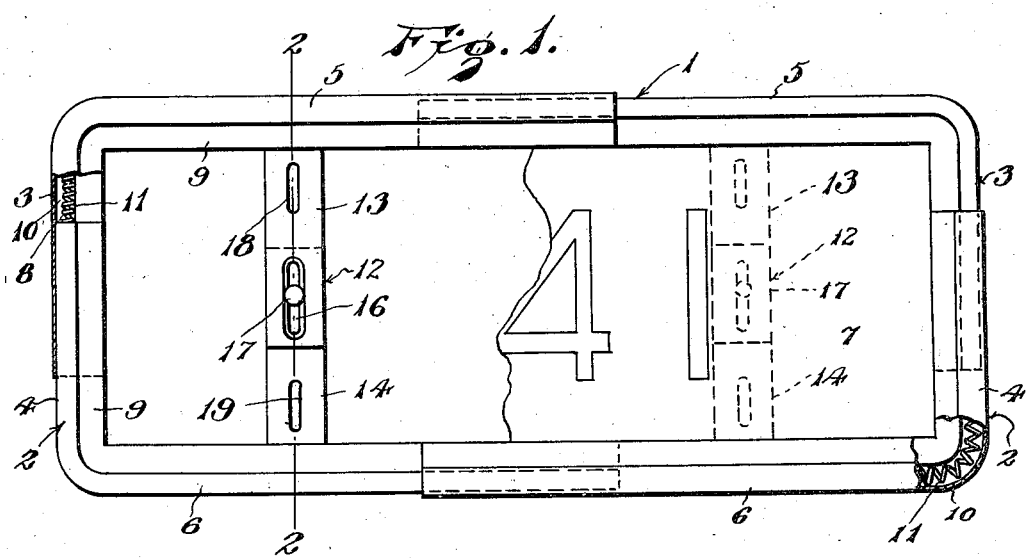

1,755,625

UNITED STATES PATENT OFFICE

DALE D. BAST, OF BRADDYVILLE, AND HARRY C. JOHNSON, OF BLANCHARD, IOWA

LICENSE-PLATE HOLDER

Application filed June 23, 1928. Serial No. 287,686.

The present invention is directed to improvements in license plate holders for attachment to motor vehicles.

The primary object of the invention is to provide a device of this character so constructed that license plates of various sizes may be maintained in the holder.

Another object of the invention is to provide a device of this character so constructed that the holder can be conveniently attached to the vehicle, the construction being such that upon removal of the holder, the same can be operated to quickly release an old license plate to permit a new one to be substituted therefor.

Another object of the invention is to provide a holder of this nature constructed in such manner that the license plate will be held firmly therein to prevent rattling.

With these and other objects in view, this invention resides in the novel features of construction, formation, combination and arrangement of parts to be hereinafter more fully described, claimed and illustrated in the accompanying drawings, in which:

Figure 1 is a rear elevation of the device, partly in section.

Figure 2 is a sectional view on the line 2—2 of Figure 1.

The holder comprises a frame 1 which consists of sections 2, each section including vertical hollow end members 3 and 4, having formed therewith upper and lower horizontal hollow members 5 and 6, respectively.

It will be observed that the members 3 and 4, and 5 and 6 are telescopically engaged in order that the frame will adjust itself to accommodate license plate 7 which may vary in width and length.

The respective sections are identical in construction, and it will be noted that each section includes inwardly directed spaced flanges 9, and when the sections are in assembled telescopic relation, a continuous chamber 10 is provided and in which is mounted an endless coil spring 11, said spring obviously serving to maintain the members yieldably connected in order that when the plate 7 is applied its marginal edges will be confined between the flanges 9, thus maintaining the plate firmly in the frame.

In order that the frame can be attached to a vehicle a pair of attaching members 12 are employed, each comprising vertically disposed overlapped plates 13 and 14, said plates being provided with slots 15 and 16 at their overlapped ends and in which are engaged clamping bolts 17, said bolts serving to normally hold the plates against relative movement in order that the upper ends of the plates 13 will engage between the flanges 9 of the upper members 5, while the lower edges of the plates 14 will snugly engage between the flanges 9 of the lower members 6.

The plates 13 and 14 are further provided with longitudinal slots 18 and 19, respectively, in which bolts 20 and 21 are engaged, said bolts serving to secure the frame to a bracket or other suitable support carried by the vehicle, and in this manner the frame will be supported for displaying the license plate 7.

It will be apparent that when it is desired to remove the plate 7 it is only necessary to release the bolts 20 and 21, after which the bolts 17 are released to permit removal of the plates 13 and 14, whereupon the respective members can be slid to expand the frame, thus permitting the plate to be readily removed, and a new one substituted therefor.

Owing to the fact that the members are held yieldably in telescopic relation with each other, the frame can be adjusted to hold plates which may vary in size.

What is claimed is:—

A device of the class described comprising a frame consisting of a pair of sections, each section including a hollow end member and upper and lower hollow members, the respective members having spaced flanges, the respective upper and lower members being telescopically engaged, an endless coil spring confined within the upper and lower members and end members, and securing devices consisting of adjustably conected plates having their ends confined between the flanges of the upper and lower members.

In testimony whereof we affix our signatures.

HARRY C. JOHNSON. [L. S.]
DALE D. BAST. [L. S.]